Dec. 14, 1926.                               1,610,709
                J. V. ROBERTS
                WATER PURIFIER
             Filed Feb. 4, 1926         2 Sheets-Sheet 1

Inventor:—
John V. Roberts.
By Martin P. Smith
Atty.

Dec. 14, 1926.

J. V. ROBERTS 1,610,709

WATER PURIFIER

Filed Feb. 4, 1926  2 Sheets-Sheet 2

Inventor:—
John V. Roberts.
By Martin R. Smith, Atty.

Patented Dec. 14, 1926.

1,610,709

UNITED STATES PATENT OFFICE.

JOHN VINCENT ROBERTS, OF LOS ANGELES, CALIFORNIA.

WATER PURIFIER.

Application filed February 4, 1926. Serial No. 85,838.

My invention relates to a water purifier and has for its principal objects the provision of a relatively simple, practical and efficient apparatus that may be advantageously and economically employed for the very thorough purification of water that is used for the generation of steam, in the manufacture of ice and for general domestic purposes where practically pure water is desired.

Further objects of my invention are to provide a water purifying apparatus wherein the water, before passing through the apparatus, is preheated to boiler temperatures and which provision greatly enhances the efficiency of the apparatus in the separation and elimination of all impurities and foreign substances from the water; further, to provide simple and efficient means for blowing out that portion of the apparatus wherein water is heated, in order to eliminate scale and sediment; further, to provide simple and efficient means for effecting the discharge whenever desired of the impurities and foreign matter that are separated from the pure water; further, to provide means whereby the water that passes through the apparatus may be treated with a suitable purifying compound in order to accelerate the elimination or separation of said impurities from the water; and further, to provide an apparatus of the character referred to that will be highly effective in performing the functions for which it is intended.

With the foregoing and other objects in view, my invention consists in certain novel features of construction and arrangement of parts that will hereinafter be more fully described and claimed and illustrated in the accompanying drawings, in which—

Figure 1:
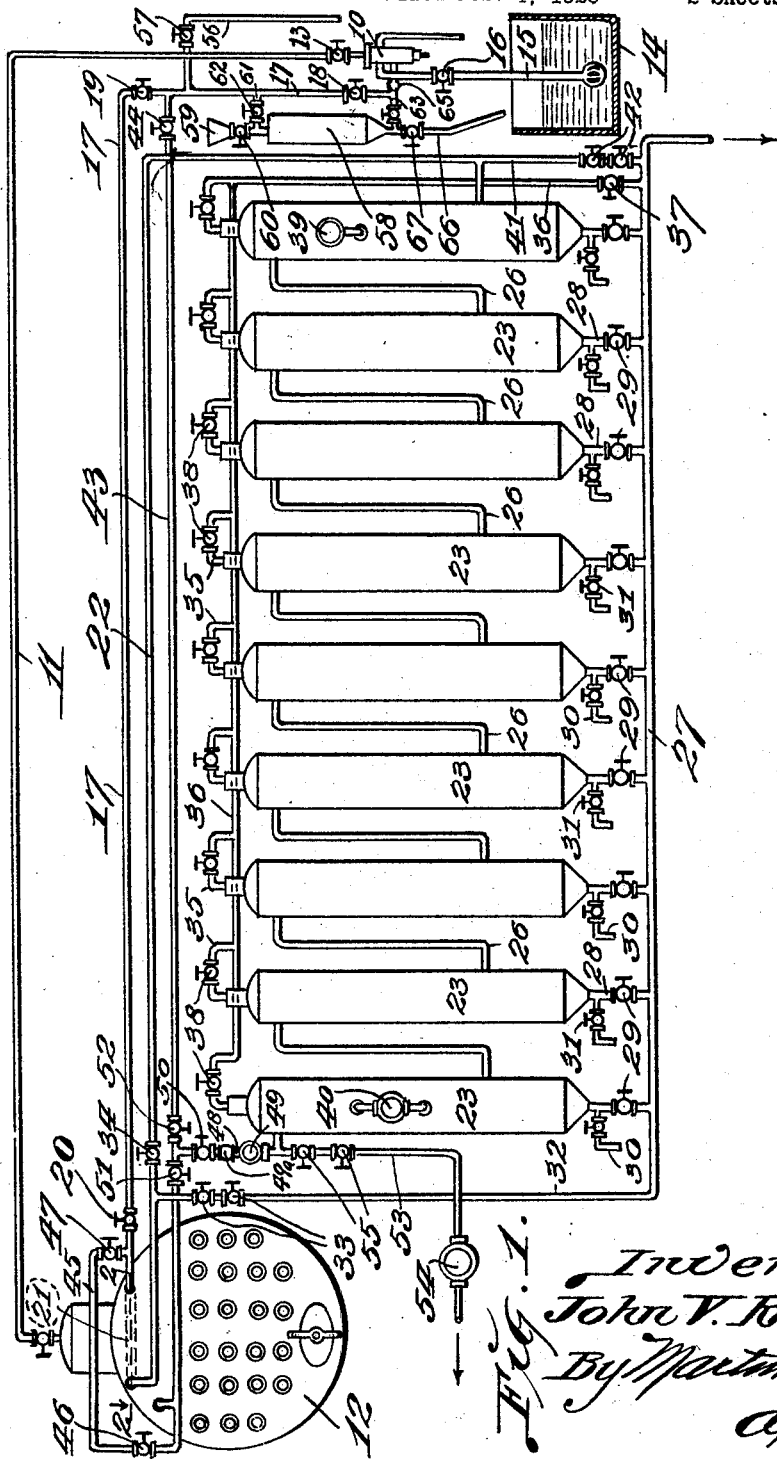
Fig. 1 is a diagrammatic elevational view of a water purifying apparatus of my improved construction and showing the same associated with a steam generating boiler.
Figure 2:
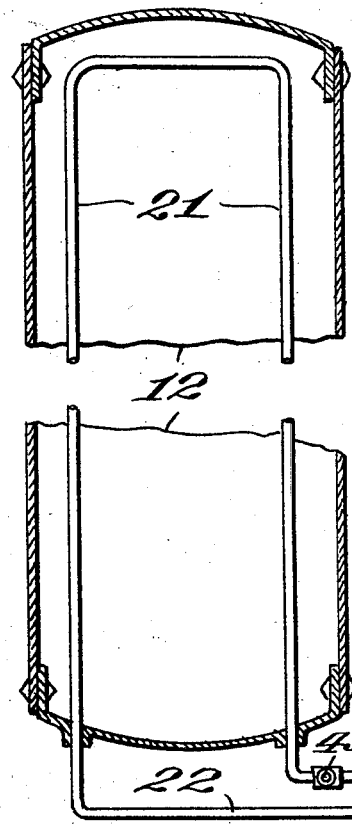
Fig. 2 is an enlarged horizontal section taken approximately on the line 2—2 of Fig. 1, and showing the water heating loop that extends from the apparatus into the boiler.
Figure 3:
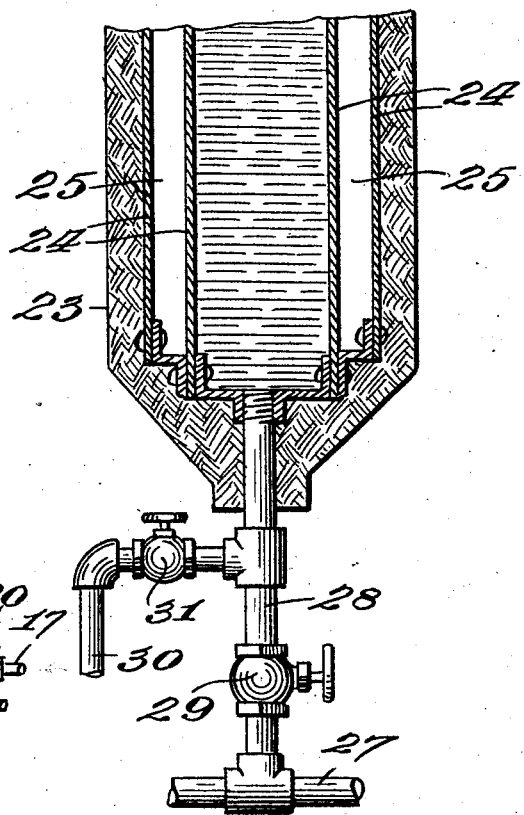
Fig. 3 is a vertical section taken through the lower portion of one of the separation tanks or containers of my improved water purifier.

Referring by numerals to the accompanying drawings, 10 designates a suitable form of injector that receives steam through a line 11 from the dome of the boiler 12 with which my improved apparatus is associated, said line 11 being provided with a valve 13 located adjacent to the injector. Leading to the injector 10 from a suitable source of supply, for instance the city mains or a tank 14 as shown, is a supply pipe 15 in which is located a valve 16. Leading from the injector 10 to the boiler 12 is a pipe 17 and located therein at points adjacent to said injector are valves 18 and 19.

Located in pipe 17 adjacent to boiler 12 is a valve 20. Pipe 17 is directly connected to one leg of a loop 21 that extends lengthwise through the steam chamber in the upper portion of boiler 12 and at the front end of said boiler the other leg of this loop 21 is integral with a tubular line 22 that leads to the lower portion of the first one of a series of upright tanks or containers 23. These upright tanks or containers which function as settling tanks for the separation of any impurities from the water are suitably insulated against the radiation of heat and I prefer to construct said tanks or containers with double walls such as 24 that are spaced apart to form dead air chambers such as 25, and the outer walls being covered with suitable insulating material such as asbestos or mineral wool.

The number of the tanks or containers 23 may vary in accordance with existing conditions and the upper portion of each tank or container is connected to the lower portion of the next adjacent tank or container by a circulation tube 26. The lower end of each tank or container is connected to a drain or waste outlet line 27 by a short tube 28 and located in each tube 28 is a valve 29.

Leading from the upper portion of each tube 28 above the valve 29 therein is a short tube 30 in which is located a valve 31. The valved tubes 30 provide means for testing the sediment conditions in the lower portions of the respective tanks or containers 23 and the valved tubes 28 that connect to waste line 27 provide means for effecting a discharge of all sediment and matter that accumulates in the lower portions of the tanks or containers.

The end of waste line 27 opposite the end that leads to the sewer is connected by a pipe 32 to line 22 at a point adjacent to the boiler, and located in this tube 32 is a pair of valves 33. Located in line 22 adjacent to the point where tube 32 connects with said line 22 is a valve 34.

The upper ends of all of the containers are connected by short tubular members 35 to a tubular line 36 that leads to the waste outlet line 27, and located in said line 36 adjacent to the point where the same connects with line 27 is a valve 37. Each tubular connection 35 is provided with a valve 38.

The parts just described provide means for permitting a discharge of all oils, magnesia, and lighter than water impurities that accumulate in the upper portions of the tanks or containers 23, and these impurities are carried to waste line 27.

Located on the first one of the series of tanks or containers 23 is a pressure gage 39 and located on the last one of the series of said tanks is a suitable temperature gage 40.

Leading from a point in line 22 where the same turns toward the lower portion of the first tank 23 to the waste line 27, is a tube 41, and located therein is a pair of valves 42. Leading from line 17 at a point just below valve 19 therein to the boiler 12 is a direct connection line 43 in which is located a valve 44 and leading from this direct connection line at a point where the same enters the boiler 12 to line 17 at a point adjacent to where the latter connects to loop 21 is a tubular connection 45 in which are located valves 46 and 47.

Leading from the upper portion of the last one of the series of tanks 23 to direct connection line 43 is a tube 48 in which is located a water meter 49. Located in this tube 48 just above the water meter is a check valve 49$^a$ and above the latter is located a valve 50. Located in line 43 on opposite sides of the point where tube 48 connects therewith, are valves 51 and 52. Leading from tube 48 is a domestic water supply pipe 53 in which is located a water meter 54 and a pair of valves 55. This domestic supply pipe provides means for drawing off from the apparatus any water that may be desired for making ice or for other domestic purposes.

Leading from line 17 at a point just below valve 19 to the sewer or to waste line 27 is an outlet or discharge pipe 56 in which is located a valve 57.

The means for treating the water supply with a suitable purifying or scale removing compound comprises a vertically disposed tank 58 having at its upper end a compound inlet tube 59 and the latter having a valve 60 and connecting the upper end of this tank with line 17 is a short tube 61 having a valve 62. The lower portion of tank 58 is connected to line 17 at a point adjacent to where the latter is connected to injector 10 by a short tube 63, and located in said connection is a valve 64. A check valve 65 is located in line 17 immediately adjacent to injector 10 and which check valve opens outwardly away from said injector. Leading from the lower end of tank 58 downwardly and discharging into tank 14 is an outlet tube 66 in which is located a valve 67.

The operation of my improved water purifying apparatus is as follows:

The injector 10 in its operation draws water through supply line 15, valve 16 being open, and this water is forced through line 17 past check valve 65 and past open valves 18, 19 and 20, and this water flows lengthwise of the boiler through loop 21 thereby becoming heated to the temperature of the boiler and in such condition, said water flows through line 22 past open valve 34 to the lower portion of the first one of the settling tanks 23.

The heated water flows upwardly through this first tank, thence downwardly through the circulation tube 26 between the first and second tanks and thence through the entire series of settling tanks and the connecting circulation tubes 26.

Inasmuch as the tanks 23 and the circulation tubes 26 are thoroughly insulated against the radiation of heat, the water, in flowing through said tanks and tubes, will be retained at practically boiler temperatures and under such conditions the separation of both lighter and heavier impurities will be accelerated. The mineral salts and heavier impurities will gradually settle to the bottom of the tanks 23 while the oils, magnesia, and lighter impurities will naturally rise to and accumulate in the upper portions of said tanks.

From the last tank of the series, the practically pure water will discharge through line 48 in which water meter 49 is located and said water will pass open valves 50 and 51 and thus enter the boiler 12, it being understood that the valves 46 and 47 in connection 45 are closed.

Whenever desired, pure water for domestic purposes may be drawn off through outlet pipe 53 by opening valves 55 and such water is measured as it passes through meter 54. The pressure of the water flowing through the settling tanks is ascertained by means of pressure gage 39 and the temperature of the water at the rear end of the apparatus is obtained by means of the temperature indicator 40.

At predetermined intervals, or whenever desired, valves 38 in connections 35 and valve 37 in outlet line 36, may be opened in order to permit the discharge of oils, magnesia, and other lighter impurities that accumulate in the upper portions of the settling tanks 23 and which impurities pass off through waste pipe 27 to the sewer.

From time to time the valves 31 in outlet connections may be opened thereby testing the condition of the accumulations of heavier impurities at the bottoms of the settling tanks and when conditions warrant, these accumulations of heavier impurities may be discharged by opening valves 29 in connections 28.

The rapid heating of the water in loop 21 tends to produce deposits of scale on the interior surfaces of the tubes forming said loop, and it is highly desirable and essential to the successful operation of the apparatus that this scale be blown out and discharged from time to time. In order to accomplish this blowing out of the heating loop, valves 20, 34, and 51 are closed and valves 33, 46, and 47, are opened. When this is done steam at boiler pressure will leave the boiler through the end of line 43 that is connected thereto, flow through line 45 past open valves 46 and 47, and thence through loop 21, and in its passage through said loop the steam will loosen and blow out the scale and sediment and the latter will pass through that portion of line 22 that is immediately adjacent to the boiler and thence through waste line 32, 27 past the open valves 33.

Thus provision is made for blowing out the heating loop that passes through the boiler and which provision is highly desirable in maintaining the apparatus in perfect operating condition.

If for any reason it is desired to deliver water from the injector directly into the boiler without passing said water through the purifying apparatus, valve 19 is closed and valves 44, 51, and 52 in line 43, are opened and thus water will pass directly through said line 43 from the injector to the boiler.

When it is desired to treat the water that is being delivered to the boiler or to the purifying apparatus with a compound having properties that will tend to eliminate scale and produce a more rapid precipitation or separation of the impurities, valves 62 and 64 are closed and valves 60 and 67 are opened in order to permit a discharge of any water that may be contained in tank 58. Valve 67 is now closed and the water treating compound is now delivered to tank 58 through inlet connection 59. Valve 60 is now closed and valves 62 and 64 are opened, and valve 18 in line 17 is closed. As the injector 10 is operated the water discharged therefrom will be forced through tank 58 and pass from the upper end thereof through connection 61 to line 17 above the closed valve 18, thus carrying with it the compound and which latter will pass through the system with the water to produce the desired results.

In some instances it may be found desirable and advantageous to use a pump instead of the injector 10, and in order to conserve heat, it is desirable, though not essential, that the circulating tubes 26 between the tanks and circulation lines 17 and 22 be covered with suitable heat-insulating material such as asbestos, mineral wool, or the like.

Thus it will be seen that I have provided a water purifying system that is relatively simple in construction, and which may be economically and advantageously employed for the effective purification of water that is used for the generation of steam and for general domestic purposes.

It will be understood that minor changes in the size, form and construction of the various parts of my improved water purifier may be made and substituted for those herein shown and described without departing from the spirit of my invention, the scope of which is set forth in the appended claims.

I claim as my invention:

1. In a structure of the class described, the combination with a boiler, of a heating loop extending through the steam space within said boiler, a water supply line leading to said loop, means actuated by steam pressure from the boiler for forcing water through said supply line, a branch water supply line leading directly from the first-mentioned water supply line to the boiler, a series of upright settling tanks, a circulation line leading from the loop to the first tank in the series, a steam supply line leading from the steam chamber of the boiler to the water supply line that leads to the heating loop and a circulation tube connecting the upper portion of each settling tank with the lower portion of the next adjacent settling tank.

2. In a structure of the class described, the combination with a boiler, of a heating loop extending through the steam space within said boiler, a water supply line leading to said loop, means actuated by steam pressure from the boiler for forcing water through said supply line, a branch water supply line leading directly from the first-mentioned water supply line to the boiler, a series of upright settling tanks, a circulation line leading from the loop to the first tank in the series, a steam supply line leading from the steam chamber of the boiler to the water supply line that leads to the heating loop, a circulation tube connecting the upper portion of each settling tank with the lower portion of the next adjacent settling tank, a valved outlet at the lower end of each tank, and a valved outlet at the upper end of each tank.

3. In a structure of the class described, the combination with a boiler, of a heating loop extending through the steam space within said boiler, a water supply line leading to said loop, means actuated by steam pressure from the boiler for forcing water through said supply line, a branch water supply line leading directly from the first-mentioned water supply line to the boiler, a series of upright settling tanks, a circulation line leading from the loop to the first tank in the series, a steam supply line leading from the steam chamber of the boiler to the water supply line that leads to the heating loop, a circulation tube connecting the upper portion of each settling tank with the lower portion of the next adjacent settling tank, a valved blow off connection leading from said heating loop, a valved outlet at the upper end of each tank and a valved outlet at the lower end of each tank.

4. In a structure of the class described, the combination with a boiler, of a heating loop extending through the steam space within said boiler, an injector, a steam supply line leading from the boiler to said injector, a water supply pipe leading from the injector to said loop, a branch water supply line leading from said water supply pipe directly to the boiler, a tubular connection from said branch water supply line to the water supply line that leads to said loop, a valved waste line leading from said loop, a series of settling tanks, connections between said tanks, a connection from the waste line that leads from the heating loop in the boiler to the first one of the settling tanks in the series, valved outlets at the upper ends of the tanks and valved outlets between the lower ends of said tanks and the waste line that leads from the heating loop.

5. In a structure of the class described, the combination with a boiler, of a heating loop extending through the steam space within said boiler, an injector, a steam supply line leading from the boiler to said injector, a water supply pipe leading from the injector to said loop, a branch water supply line leading from said water supply pipe directly to the boiler, a tubular connection from said branch water supply line to the water supply line that leads to said loop, a valved waste line leading from said loop, a series of settling tanks, connections between said tanks, a connection from the waste line that leads from the heating loop in the boiler to the first one of the settling tanks in the series, valved outlets at the upper ends of the tanks, valved outlets between the lower ends of said tanks and the waste line that leads from the heating loop and means for supplying water treating compound to the water supply pipe that leads from said injector.

In testimony whereof I affix my signature.

JOHN VINCENT ROBERTS.